United States Patent
Song et al.

(10) Patent No.: US 6,307,323 B1
(45) Date of Patent: Oct. 23, 2001

(54) FIELD EMISSION DISPLAY WITH DIODE-TYPE FIELD EMITTERS

(75) Inventors: Yoon Ho Song; Jin Ho Lee, both of Taejon; Seung Youl Kang, Seoul; Kyoung Ik Cho, Taejon, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/474,528

(22) Filed: Dec. 29, 1999

(30) Foreign Application Priority Data

Aug. 4, 1999 (KR) .................................................. 99-31976

(51) Int. Cl.$^7$ ...................................................... G05G 3/10

(52) U.S. Cl. ........................ 315/169.1; 345/74; 313/495

(58) Field of Search .............................. 315/169.1, 169.2, 315/169.3, 169.4; 313/495, 496; 345/91, 92, 74, 76

(56) References Cited

U.S. PATENT DOCUMENTS

| | | | |
|---|---|---|---|
| 4,907,862 | * 3/1990 | Suntola ................................ | 350/345 |
| 5,015,912 | 5/1991 | Spindt et al. ........................ | 313/495 |
| 5,402,041 | 3/1995 | Kishino et al. ..................... | 315/169.1 |
| 5,404,074 | * 4/1995 | Watanabe et al. .................... | 313/495 |
| 5,616,991 | 4/1997 | Casper et al. ........................ | 315/167 |
| 5,764,000 | * 6/1998 | Mougin et al. ...................... | 313/496 |
| 5,939,833 | * 8/1999 | Song et al. .......................... | 315/169.1 |
| 5,999,149 | * 12/1999 | Lee et al. .............................. | 345/74 |
| 6,069,451 | * 5/2000 | Hush et al. .......................... | 315/169.1 |

OTHER PUBLICATIONS

Baptist et al., "Microtips and Resistive Sheet: A Theoretical Description of the Emissive Properties of This System," 9$^{th}$ *Int. Vacuum Microelectronics Conf.*, St. Petersburg, pp. 19–23, 1996.

Kanemaru et al., "MOSFET—Structured Si Field Emitter Tip," *Technical Digest of IVMC* 97, Kyongju, Korea, pp. 34–37, 1997.

Saito et al., "Field Emission From Carbon Nanotubes and Its Application to FED Elements," *Asia Display Digest*, pp. 173–181, 1998.

Li Tolt et al., "Addressable Carbon Thin Film Cathode," *Asia Display Digest*, pp. 1153–1156, 1998.

Choi et al., "Late–News Paper: A 4.5–in. Fully Sealed Carbon Nanotube–Based Field–Emission Flat–Panel Display," *SID '99 Digest*, pp. 1134–1137, 1999.

\* cited by examiner

*Primary Examiner*—Don Wong
*Assistant Examiner*—Tuyet T. Vo
(74) *Attorney, Agent, or Firm*—Seed IP Law Group PLLC

(57) ABSTRACT

A field emission display in which field emission devices are applied to a flat panel display. A field emission display with diode-type field emitters includes an upper plate and a lower plate, the upper plate and the lower plate are vacuum-packaged in parallel. The lower plate includes a plurality of column signal buses and a plurality of row signal buses, film type field emitters, and switching devices. The column signal buses and the row signal buses are made of metallic material. Pixels are defined by the column signal buses and the row signal buses. A film type field emitter and a switching device are formed inside each pixel. The switching device controls the field emitter on the basis of scan signals and data signals. The scan signals and data signals are loaded to the switching devices through the column signal buses and the row signal buses. The switching device includes at least three electrodes for connection with the column signal bus, the row signal bus, and the field emitter.

13 Claims, 6 Drawing Sheets

FIELD EMISSION DISPLAY WITH DIODE-TYPE FIELD EMITTERS

TECHNICAL FIELD

The present invention relates to a field emission display. More particularly, the present invention relates to a field emission display in which field emission devices are applied to the flat panel display.

BACKGROUND OF THE INVENTION

Conventionally, a field emission display is manufactured by vacuum-packaging a lower plate and an upper plate in parallel. The space between the lower plate and the upper plate is within 2 mm. The lower plate includes field emission devices and the upper plate includes phosphors. Electrons are emitted from the field emission devices of the lower plate and the electrons are collided against the phosphors of the upper plate. Right at this time, cathode luminescence effect happens and an image is displayed. Recently, many studies have been performed regarding such field emission displays as a promising flat panel display, replacing conventional cathode ray tube displays.

The key component of field emission display devices is the field emitter and the electron emission efficiency of the field emitter depends upon the structure of the device, the material of the emitter, and the shape of the emitter. The structure of the field emitter can be categorized into diode type and triode type. The diode type includes a cathode and an anode. The triode type includes a cathode, a gate, and an anode. Materials such as metal, silicon, diamond, diamond-like carbon, and carbon nanotube are used as the material of the emitter. Generally, metal or silicon is used to manufacture the triode type and the diamond or carbon nanotube is used for the diode type.

Even though the diode-type field emitters are handicapped by controllability of electron emission and low voltage operation, they are advantageous in some ways. For example, the manufacturing process of the diode-type field emitters is simpler and the reliability of electron emission is higher than the one of the triode-type field emitters.

FIG. 1 shows a diagram illustrating the structure of a conventional field emission display with diode-type field emitters.

Conventional field emission display with diode-type field emitters includes a lower plate 13 with field emitter material and an upper plate 16. The lower plate 13 includes metal electrodes 11 and field emitter material 12 that is filmed on top of the metal electrodes 11. The upper plate 16 includes transparent electrodes 14 and red, green, and blue phosphor 15. With the help of spacer 17, the lower plate 13 and the upper plate 16 are placed in parallel and vacuum-packaged.

In FIG. 1, the metal electrode 11 and the transparent electrode 14 work as a cathode and an anode of field emission devices, respectively. The metal electrode 11 and the transparent electrode 14 are crossed and the crossing section is defined as a pixel.

The conventional field emission display with diode-type field emitters operates as follows.

As shown in FIG. 2, the row signal bus 21R is connected with film-type field emitters 22 in the lower plate 13. Also, as shown in FIG. 3, the column signal bus 31C is connected with the phosphors 32 in the upper plate 16. The row signal bus 21R and the column signal bus 31C can be varied on the basis of the direction of arrangement of the upper plate 16 and the lower plate 13.

The display can be driven in a matrix addressing. The row signal bus 21R selects a row and then the column signal bus 21C carries display signals into the pixels of the selected row. Then, the next row is addressed in the same way, sequentially.

The electric field necessary for the electron emission is determined by a voltage difference between the column signal bus 31C and the row signal bus 21R. When an electric field higher than $1V/\mu m$ is leaded to the field emitter material, electron emissions at the field emitter begin.

Unlike cone-shaped triode-type field emitters, diode-type field emitters don't employ insulation film between the gate and the cathode, and therefore the structure and the manufacturing process is simple. In addition, the reliability of the diode-type field emitters is high because the destruction rate of field emitters is very low when electrons are emitted. The destruction of the gate or the gate insulator, which commonly occurs in triode field emitters, rarely occurs in diode-type field emitters.

However, since high voltages have to be loaded at each electrode of the upper plate 16 and the lower plate 13 (the metal electrode of the lower plate 13 and the transparent electrode of the upper plate 16) in field emission displays with diode-type field emitters, high voltage display signals are needed and therefore expensive high-voltage operation circuits are also required. Generally, the space between the electrodes of the upper plate 16 and the lower plate 13 is larger than 200 $\mu m$ and smaller than 2 mm.

Especially, the anode electrode, the transparent electrode shown in FIG. 1, is used as a display signal bus and an acceleration electrode of electrons at the same time, low voltage operation is almost impossible. That is, since high-energy electrons of more than 200 eV are required to illuminate phosphors in field emission display, a voltage of more than 200V should be biased to the anode electrode. Also, since the structure of diode-type field emitters is thin-film type, the attribute of electron emission is not stable and therefore uniformity is low.

Also, pixels of a conventional field emission display with diode-type field emitters are not electrically isolated each other. Therefore, as the size and resolution of displays increase, the cross-talk of display signals becomes worse.

SUMMARY OF THE INVENTION

The present invention provides a field emission display with diode-type field emitters, which can be operated with low-voltage driver circuits and therefore a high-resolution large-screen display can be implemented.

A field emission display with diode-type field emitters comprises an upper plate and a lower plate. The upper plate and the lower plate are vacuum-packaged in parallel. The lower plate comprises a plurality of column signal buses and a plurality of row signal buses, film type field emitters, and switching devices. The column signal buses and the row signal buses are made of metallic material. Pixels are defined by the column signal buses and the row signal buses. A film-type field emitter and a switching device are formed inside each pixel. The switching device controls the field emitter on the basis of scan signals and data signals. The scan signals and data signals are loaded to the switching device through said column signal buses and said row signal buses. The switching device includes at least three electrodes for connection with the column signal bus, the row signal bus, and the field emitter.

The upper plate comprises phosphors and anode electrodes for accelerating electrons with high energy. The electrons are emitted from the field emitters of the lower plate.

Desirably, the film-type field emitter is made of diamond.

Desirably, the film-type field emitter is made of diamond-like carbon.

Desirably, film-type field emitter is made of carbon nanotube.

Desirably, the switching device is a transistor. The gate of the transistor is connected with a row signal bus. The source of the transistor is connected with a column signal bus. The drain of the transistor is connected with the field emitter. The column signal bus and the row signal bus define a pixel.

Desirably, the switching device further comprises a resistor, with the transistor, between the drain of the transistor and the field emitter.

Desirably, the switching device further comprises a high-voltage transistor, with the transistor. The source of the high-voltage transistor is connected with the drain of the transistor and the drain of the high-voltage transistor is connected with the field emitter. The high-voltage transistor includes a gate.

Desirably, the switching device further comprises a resistor, with the transistor and the high-voltage transistor, between the drain of the high-voltage transistor and the field emitter. The high-voltage transistor includes a gate.

Desirably, the switching device further comprises a high-voltage transistor, with the transistor. The source of the high-voltage transistor is connected with the drain of the transistor. The drain of the high-voltage transistor is connected with the field emitter. The gate of the high-voltage transistor is connected with the column signal bus.

Desirably, the switching device further comprises a resistor, with the transistor and the high-voltage transistor, between the drain of the high-voltage transistor and the field emitter. The gate of the high-voltage transistor is connected with the column signal bus.

Desirably, the transistors and the high-voltage transistors are thin-film transistors.

Desirably, the transistors and said high-voltage transistors are metal-oxide-semiconductor field effect transistors.

Desirably, gray representation of the display is derived from changing the pulse amplitude and/or the pulse width of the data signal, said data signal being loaded to said switching device through the column bus lines.

A field emission display with diode-type field emitters comprises an upper plate and a lower plate. Pixels are arranged as a matrix form. The upper plate and the lower plate are vacuum-packaged in parallel and each pixel of the lower plate comprises a first thin film transistor, a second thin film transistor, a resistance layer, and a thin film field emitter.

The first thin film transistor comprises a common channel, a common source, a common drain, a first gate insulation layer, and a first gate. The common channel is made of silicon thin film. The common source and common drain are formed at both ends of the common channel. The first gate insulation layer is formed on a part of the common channel. The common source, and the common drain, and the first gate are formed on a part of the common channel and the first gate insulation layer.

The second thin film transistor comprises a second gate insulation layer and a second gate. The second gate insulation layer is formed on the first gate insulation layer. The first gate and the second gate are formed on a part of the common channel and the second gate insulation layer. The second gate is vertically formed without overlapping with the first gate.

The resistance layer is formed on a part of the common drain. The thin film field emitter is formed on the resistance layer.

Desirably, the common channel is made of amorphous silicon thin film.

Desirably, the common channel is made of polycrystalline silicon thin film.

Desirably, the common source and the common drain are made of n-type silicon thin film or metallic material.

Desirably, the first gate insulation layer and said second insulation layer are made of silicon dioxide film or silicon nitride film.

Desirably, the first gate and the second gate are made of n-type silicon thin film or metallic material.

Desirably, the resistance layer is made of silicon thin film.

Desirably, the thin film field emitter is made of carbon nanotube.

BRIEF DESCRIPTION OF THE DRAWINGS

The embodiments of the present invention will be explained with reference to the accompanying drawings, in which.

DETAILED DESCRIPTION OF THE INVENTION

The embodiments of the present invention will be explained with reference to the accompanying drawings.

Figure 1:
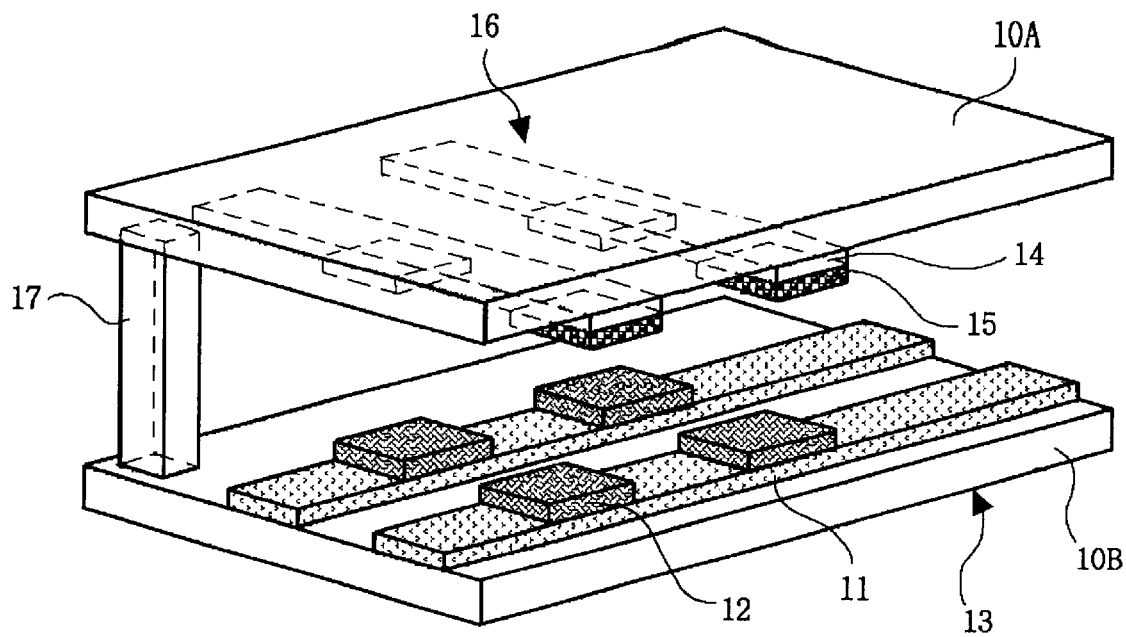
FIG. 1 is a diagram illustrating the structure of a conventional field emission display with diode-type field emitters.
Figure 2:
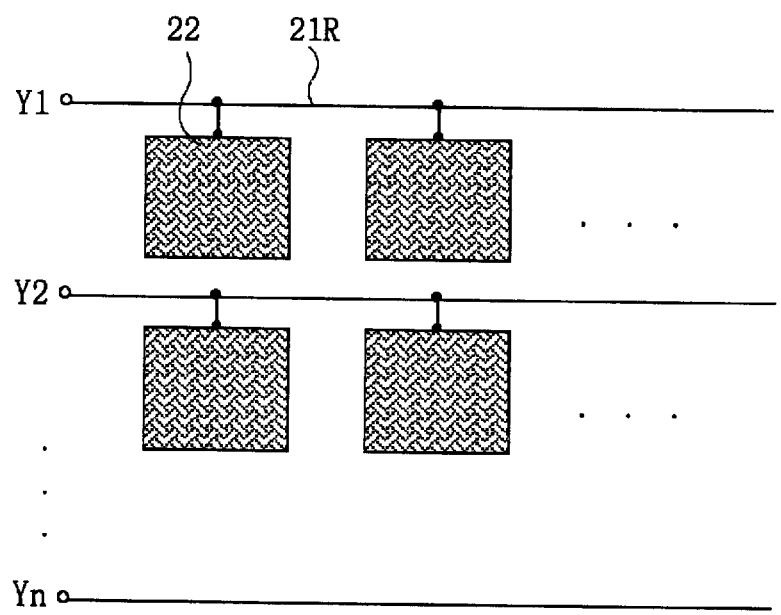
FIG. 2 is a diagram illustrating the structure of the lower plate of a conventional field emission display with diode-type field emitters.
Figure 3:
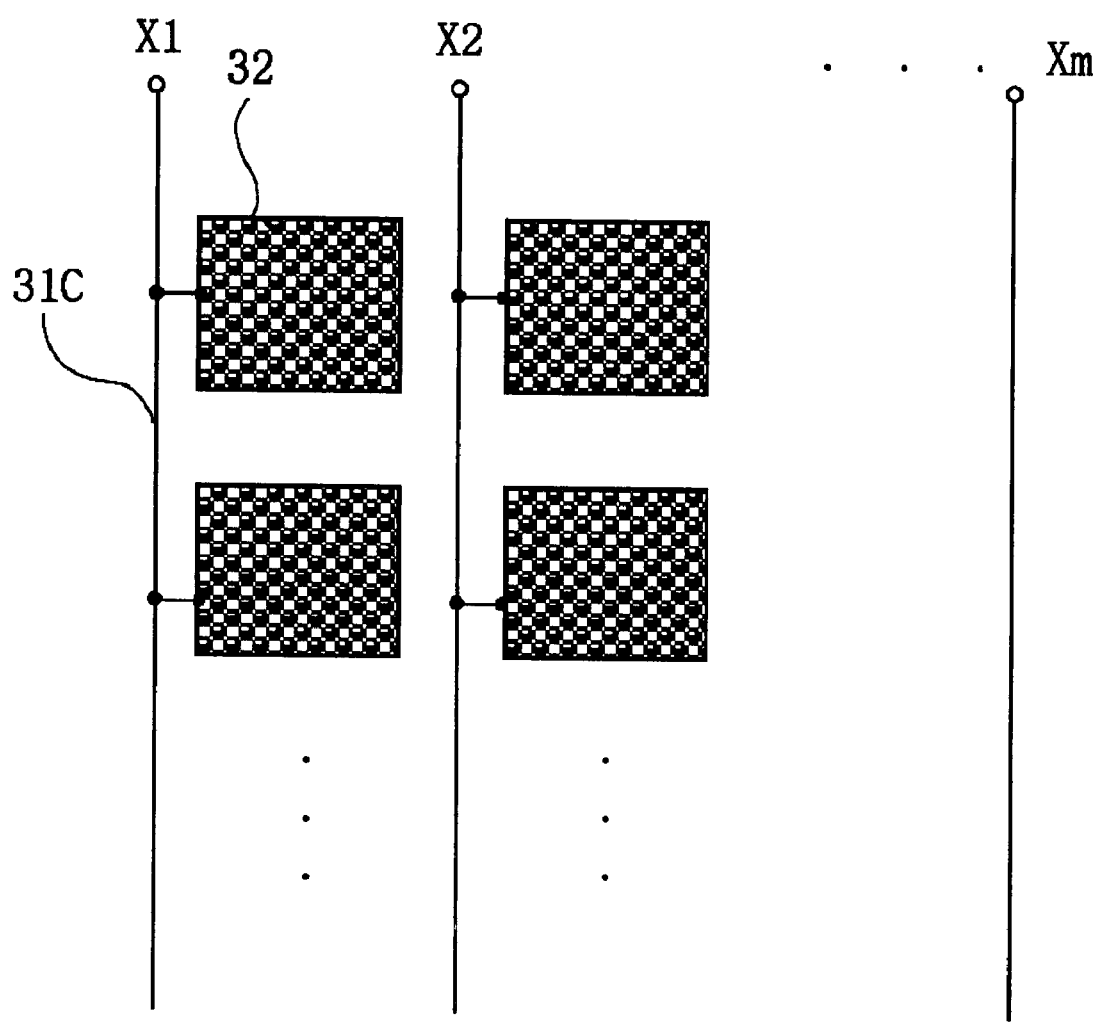
FIG. 3 is a diagram illustrating the structure of the upper plate of a conventional field emission display with diode-type field emitters.
Figure 4:
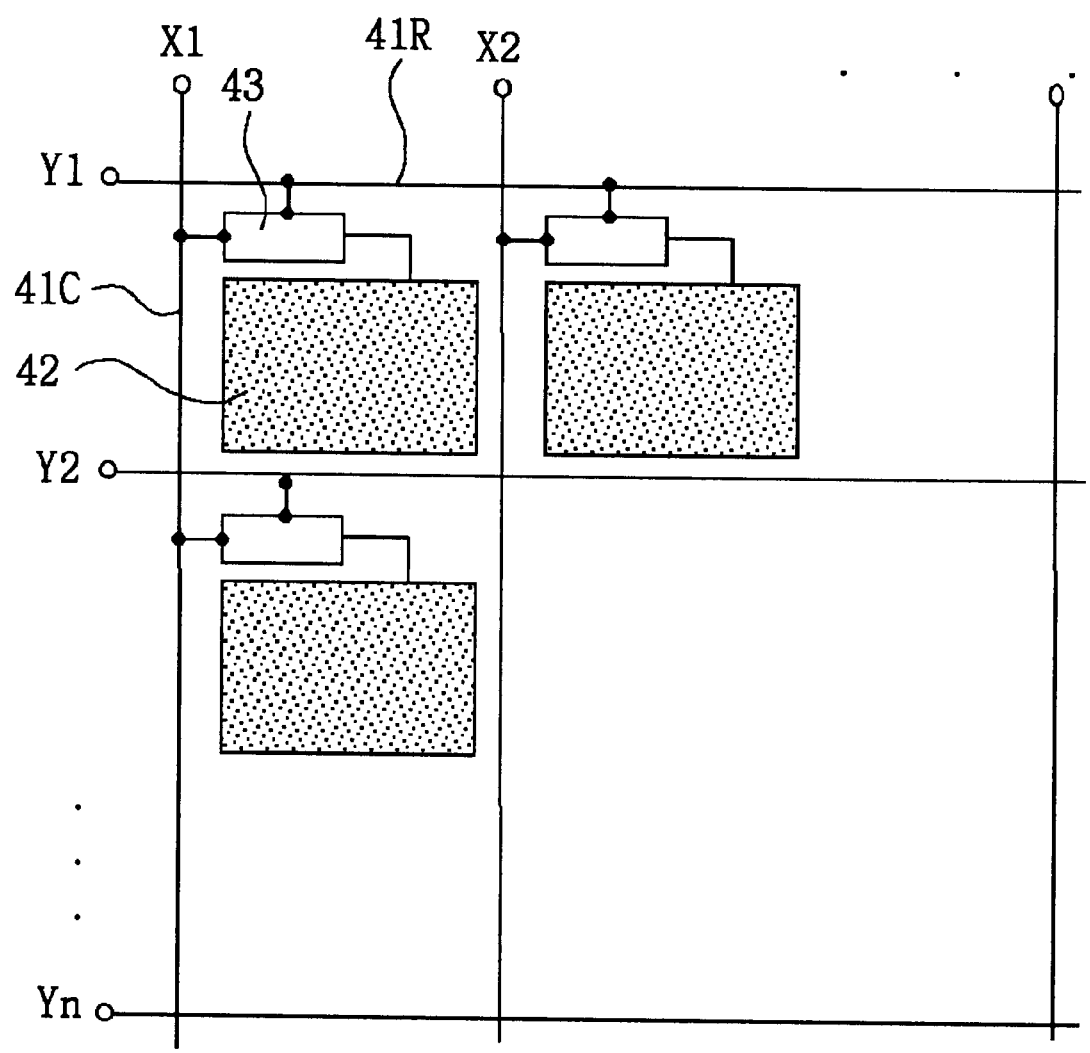
FIG. 4 is a diagram illustrating the structure of the lower plate of a field emission display with diode-type field emitters in accordance with an embodiment of the present invention.

FIG. 4 is a diagram illustrating the structure of the lower plate of a field emission display with diode-type field emitters in accordance with an embodiment of the present invention. As shown in FIG. 4, a field emission display is manufactured by vacuum-packaging a lower plate and an upper plate in parallel.

The lower plate includes column signal buses 41C, row signal buses 41R, field emitters 42, and switching devices 43. The column signal buses 41C and the row signal buses 41R enable row-column addressing and they are implemented by metallic material. The column signal buses 41C and the row signal buses 41R define pixels, and each pixel has a film type field emitter 42 and a switching device 43. The switching device 43 controls the field emitter 42 on the basis of the scan signals and the data signals, which are loaded to the switching device through the column signal buses 41C and the row signal buses 41R. The switching device 43 is equipped with at least three electrodes and they are connected with a row signal bus, a column signal bus, and a field emitter, respectively.

The upper plate is not shown in FIG. 4 and it includes phosphors and anode electrodes, which accelerate electrons with high energy. The field emitter 42 emits the electrons.

The field emission display with diode-type field emitters in accordance with the present invention operates as follows. For a panel where the lower plate and the upper plate are vacuum packaged, a high voltage is loaded to the anode of the upper plate (transparent electrode) and electrons are emitted from the field emitter of the lower plate. At the moment, emitted electrons are accelerated by high energy. Since red, green, and blue phosphors are implemented at a part of the anode, emitted electrons collide with the phosphors and an image is formed.

Row signal buses and column signal buses define pixels and switching devices are located at the pixels. The scan signal and the data signal are loaded to the switching device 43, and the switching device 43 controls the amount of electrons emitted from the field emitter 42. The gray representation of the field emission display with diode-type field emitters in accordance with the present invention can be obtained by changing the pulse amplitude and/or the pulse width of the data signal.

The field emitter 42 is implemented as a film of diamond, diamond-like carbon, and carbon nanotube. A thin-film transistor or a metal-oxide-semiconductor field effect transistor implements the switching device 43. The switching device has three electrodes. Two of them are connected with the row signal bus 41R and the column signal bus 41C and the third one is connected with the film type field emitter 42.

The switching device can have various structures. FIG. 5 through FIG. 10 are schematic diagrams illustrating switching components of lower plate pixels of a field emission display with diode-type field emitters in accordance with an embodiment of the present invention.

Figure 5:
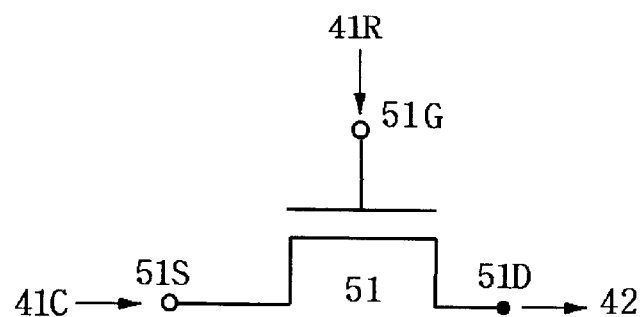
FIG. 5 through FIG. 10 are schematic diagrams illustrating switching components of lower plate pixels of a field emission display with diode-type field emitters in accordance with an embodiment of the present invention.

In FIG. 5, a transistor 51 implements the switching device. The row signal bus 41R and the column signal bus 41C are connected with the gate 51G and the source 51S of the transistor, respectively. The field emitter 42 is connected with the drain 51D of the transistor. When an active level signal is supplied to the gate 51G through the row signal bus 41R, the transistor 51 is turned on and startsconducting. At this state, if another active level signal is supplied to the source 51S through the column signal bus 41C, an operating signal is applied to the field emitter 42 and then electrons are emitted from the field emitter.

Figure 6:
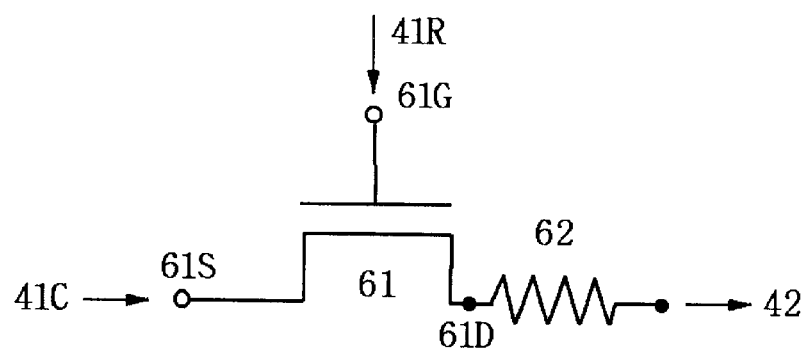

In FIG. 6, a transistor 61 and a resistor 62 implement the switching device. The row signal bus 41R and the column signal bus 41C are connected with the gate 61G and the source 61S of the transistor, respectively. The resistor 62 is located between the drain 61D of the transistor and the field emitter 42, so the drain 61D of the transistor 61 is connected with the field emitter 42 through the resistor 62.

Figure 7:
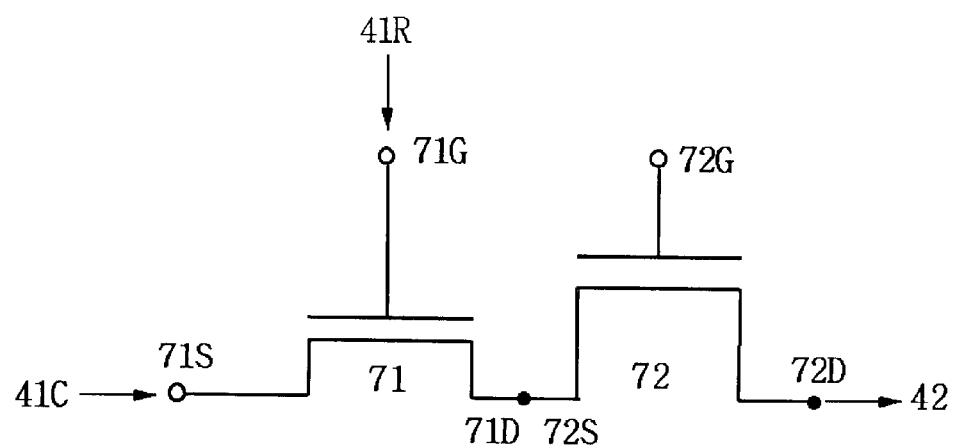

In FIG. 7, a transistor 71 and a high-voltage transistor 72 implement the switching device. The row signal bus 41R and the column signal bus 41C are connected with the gate 71G and the source 71S of the transistor, respectively. The drain 71D of the transistor is connected with the source 72S of the high-voltage transistor 72. The drain 72D of the high-voltage transistor 72 is connected with the field emitter 42. The gate 72G of the high-voltage transistor 72 is separated.

Figure 8:
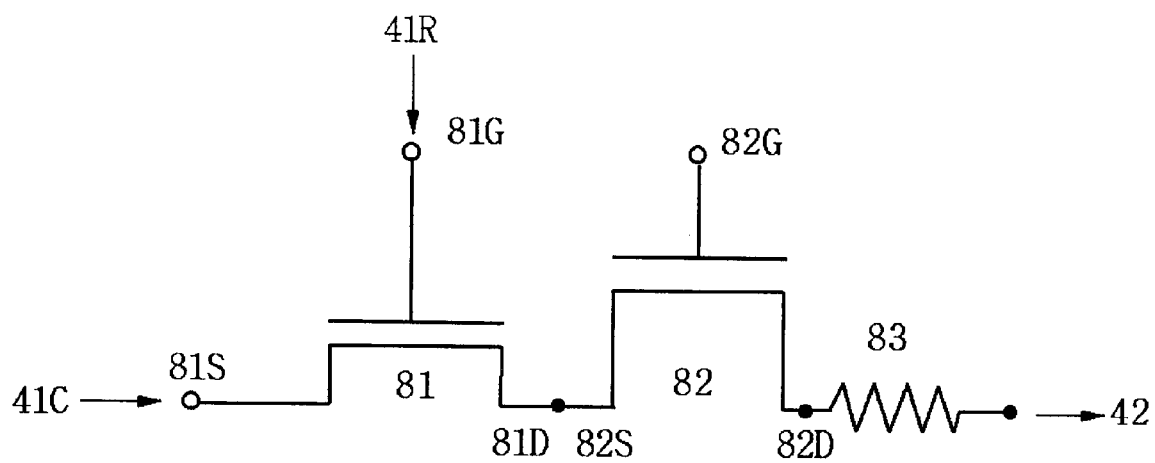

In FIG. 8, a transistor 81, a high-voltage transistor 82, and a resistor 83 implement the switching device. The row signal bus 41R and the column signal bus 41C are connected with the gate 81G and the source 81S of the transistor, respectively. The drain 81D of the transistor is connected with the source 82S of the high-voltage transistor 82. The drain 82D of the high-voltage transistor 82 is connected with the field emitter 42 through the resistor 83. The gate 82G of the high-voltage transistor 82 is separated.

Figure 9:
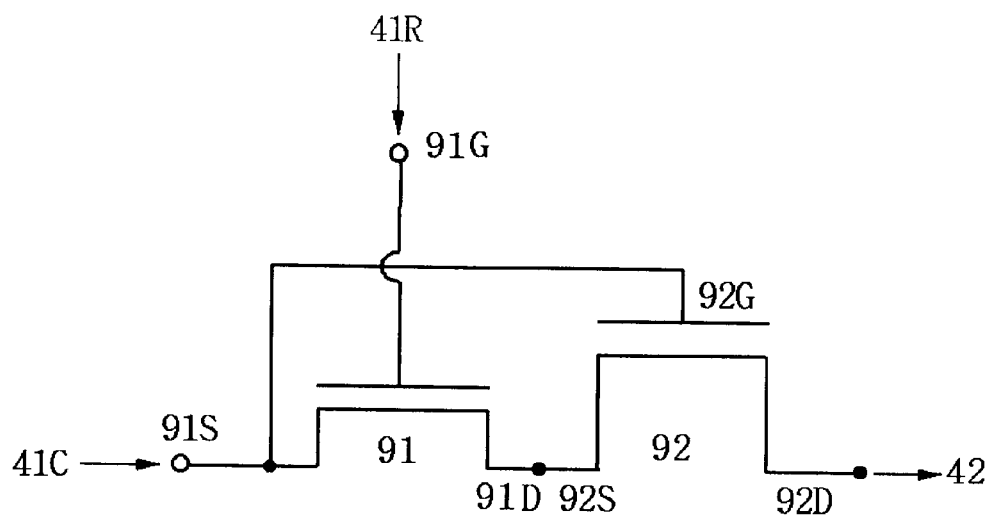

In FIG. 9, a transistor 91 and a high-voltage transistor 92 implement the switching device. The row signal bus 41R and the column signal bus 41C are connected with the gate 91G and the source 91S of the transistor, respectively. The drain 91D of the transistor is connected with the source 92S of the high-voltage transistor 92. The drain 92D of the high-voltage transistor 92 is connected with the field emitter 42. The gate 92G of the high-voltage transistor 72 is connected with the column signal bus 41C.

Figure 10:
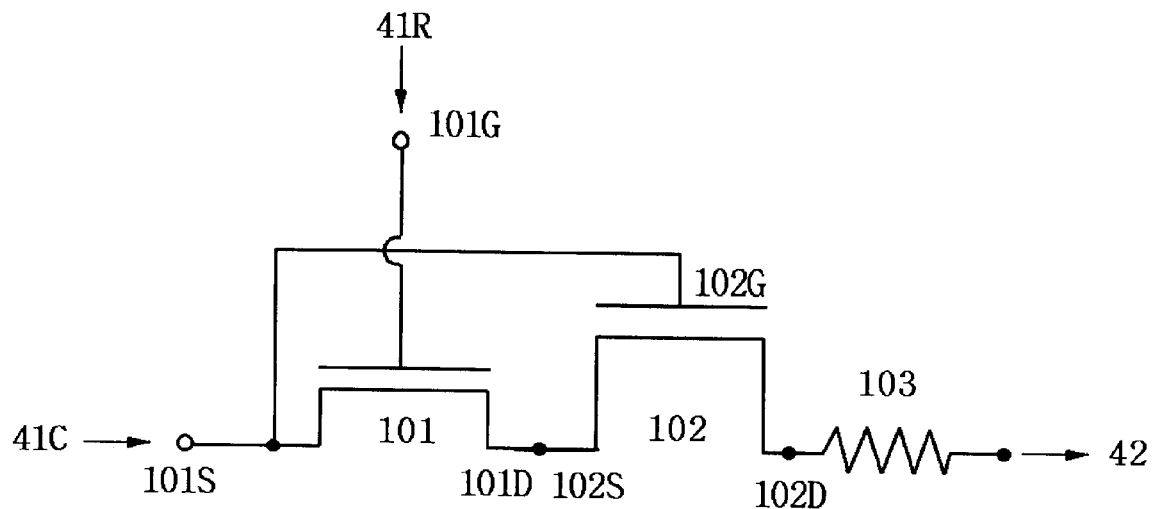

In FIG. 10, a transistor 101, a high-voltage transistor 102, and a resistor 103 implement the switching device. The row signal bus 41R and the column signal bus 41C are connected with the gate 101G and the source 101S of the transistor, respectively. The drain 101D of the transistor 101 is connected with the source 102S of the high-voltage transistor 102. The drain 102D of the high-voltage transistor 102 is connected with the field emitter 42 through the resistor 103. The gate 102G of the high-voltage transistor 102 is connected with the column signal bus 41C.

Figure 11:
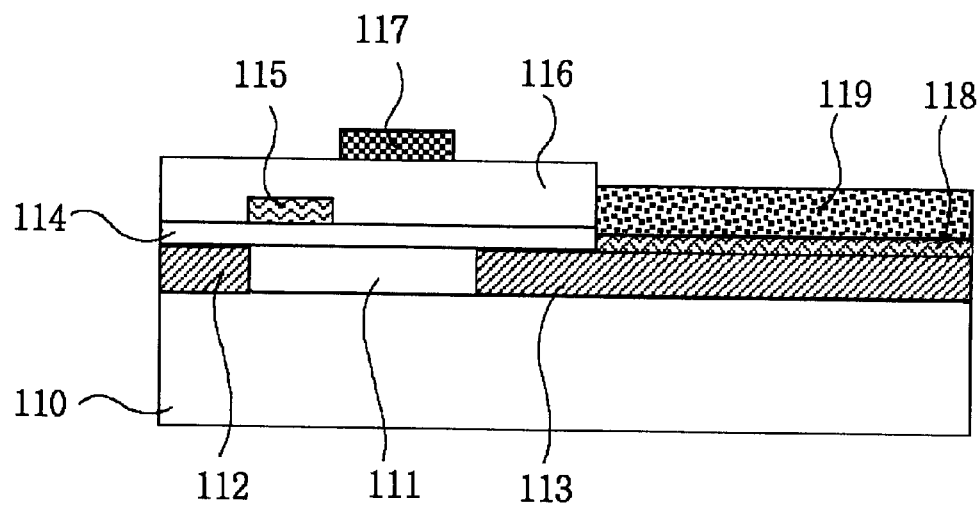
FIG. 11 is a diagram illustrating a lower plate pixel structure of a field emission display with diode-type field emitters in accordance with an embodiment of the present invention.

FIG. 11 is a diagram illustrating a lower plate pixel structure of a field emission display with diode-type field emitters in accordance with an embodiment of the present invention.

FIG. 11 shows a pixel, and a series of the pixels are arranged at the lower plate of the field emissions display.

A pixel can be divided into a first thin film transistor, a second thin film transistor, a resistance layer, and a film type field emitter.

The first thin film transistor includes a common channel 111, a common source 112, a common drain 113, a first gate insulation layer 114, and a first gate 115. The common channel is made of a silicon film and formed at the part of a glass board 110. The common source 112 and the common drain 113 are formed at both ends of the common channel 111. The first gate insulation layer 114 is formed on a part of the common channel 111, the common source 112 and the common drain 113. The first gate 115 is formed on a part of the common channel 111 and the first gate insulation layer 114.

The second thin film transistor includes a second gate insulation layer 116 and a second gate 117. The second gate insulation layer 116 is formed on top of the first gate insulation layer 114, and the first gate 115. The second gate 117 is formed on a part of the common channel 111 and the second gate insulation layer 116. The second gate 117 should not be vertically overlapped with the first gate 115.

The resistance layer 118 is formed on a part of the common drain 113 and the field emitter 119 is formed on the resistance layer 118.

The common channel 111 is implemented by amorphous silicon or polycrystalline silicon. The common source 112 and the common drain 113 are implemented by n-type silicon film or metallic material.

Silicon dioxide film or silicon nitride film implements the first gate insulation layer 114 and the second gate insulation layer 116. N-type silicon thin film or metallic material implements the first gate 115 and the second gate 117. Silicon thin film implements the resistance layer 118 and carbon nanotube implements the field emitter 119.

Although preferred embodiments of the present invention have been disclosed for illustrative purposes, those skilled in related art will appreciate that various modifications, additions and substitutions are possible, without departing from the scope and spirit of the invention as recited in the accompanying claims and the equivalents thereof.

What we claim:

1. A field emission display, comprising:

a lower plate having a plurality of row signal buses and a plurality of column signal buses formed perpendicular to said plurality of row signal buses for defining pixels, a switching device formed in each pixel and a thin film diode-type field emitter connected to said switching device in each pixel, wherein said switching device includes at least three electrodes for connecting said row signal bus, said column signal bus, and said field emitter; and an upper plate having phosphors and anode electrodes for accelerating electrons emitted from said field emitter.

2. The field emission display of claim 1, wherein said diode-type field emitter is made of one of either diamond, diamond-like carbon, and carbon nanotube.

3. The field emission display of claim 1, wherein said switching device includes one of either a thin-film transistor (TFT) and metal-oxide-semiconductor field effect transistor (MOSFET).

4. The field emission display of claim 1, wherein said row signal buses and said column signal buses are made of a metallic material.

5. The field emission display of claim 1, wherein said lower plate and said upper plate are vacuum-packaged in parallel.

6. The field emission display according to claim 1, wherein a gray representation of said display is derived from changing one of either pulse amplitude and pulse width of data signals, and wherein said data signals are loaded to said switching device through said column signal bus.

7. The field emission display of claim 1, wherein said switching device is a transistor, said transistor having a gate connected to said row signal bus, a source connected to said column signal bus, and a drain connected to said field emitter.

8. The field emission display of claim 7, wherein said switching device further comprises a resistor between said drain of said transistor and said field emitter.

9. The field emission display of claim 7, wherein said switching device further comprises a high-voltage transistor having a gate, a drain, and a source, wherein said source of said high-voltage transistor is connected with said drain of said transistor, and said drain of said high-voltage transistor is connected with said field emitter.

10. The field emission display of claim 9, wherein said switching device further comprises a resistor between said drain of said high voltage transistor and said field emitter.

11. The field emission display of claim 9, wherein said gate of said high voltage transistor is connected with said column signal bus.

12. The field emission display of claim 11, wherein said switching device further comprises a resistor between said drain of said high-voltage transistor and said field emitter.

13. A field emission display, comprising:

a lower plate having a plurality of row signal buses and a plurality of column signal buses formed perpendicular to said row signal buses for defining pixels, switching devices connected to said row signal buses and said column signal buses in said pixels, and thin film diode-type field emitters connected to said switching devices; and an upper plate having phosphors and anode electrodes for accelerating electrons.

* * * * *